Patented June 20, 1950

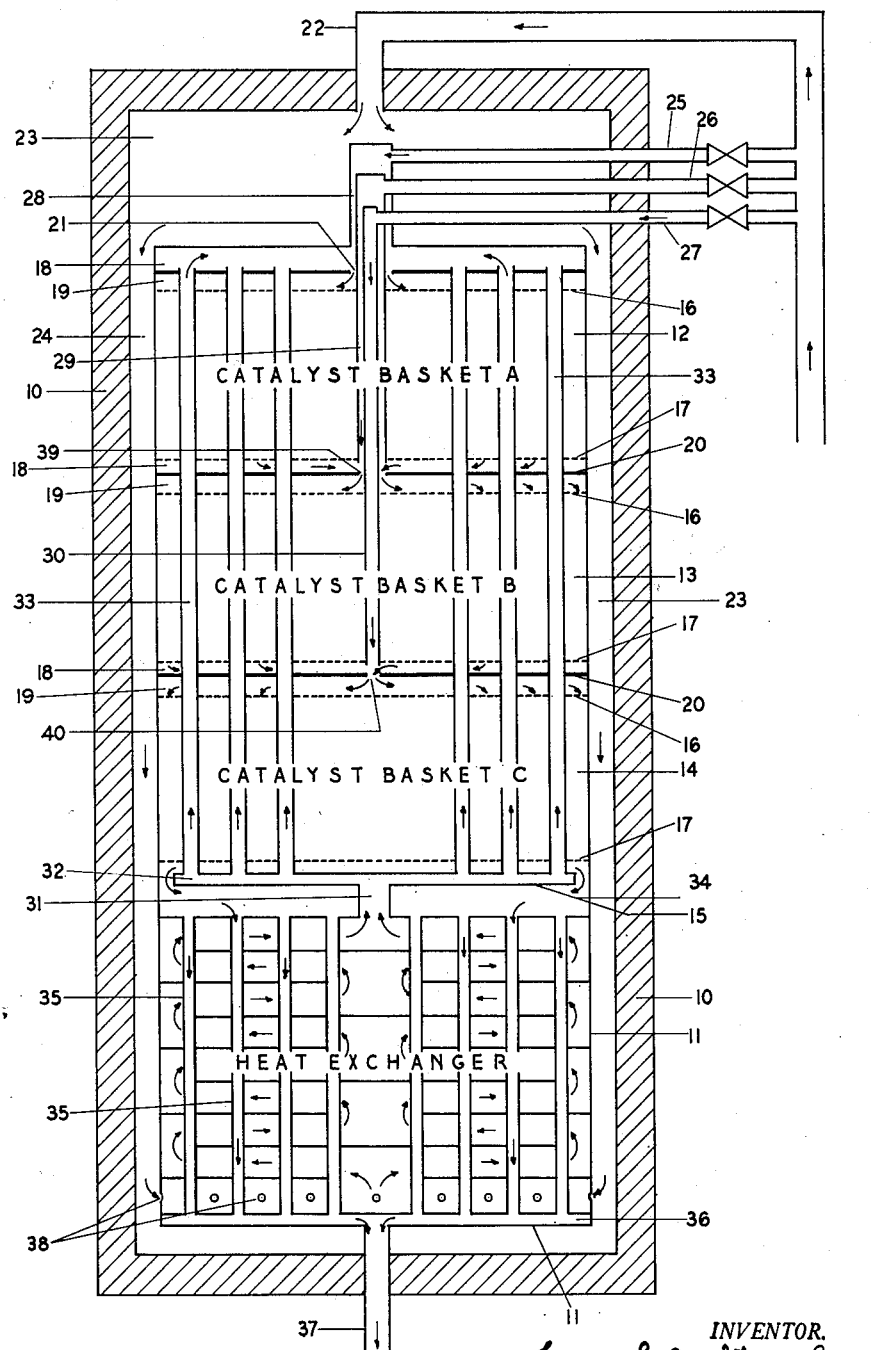

2,512,586

UNITED STATES PATENT OFFICE 2,512,586

PROCESS AND APPARATUS FOR CARRYING OUT EXOTHERMIC CHEMICAL REACTIONS

Leonard A. Stengel, Terre Haute, Ind., assignor to Commercial Solvents Corporation, Terre Haute, Ind., a corporation of Maryland Application September 4, 1945, Serial No. 614,212

3 Claims. (Cl. 23—288)

This invention relates to a method and apparatus for carrying out exothermic gaseous or vapor phase chemical reactions, and more particularly to a method and apparatus for effecting temperature control within the relatively narrow limits within the optimum reaction temperature range required for satisfactory yields of product.

In the manufacture of valuable products such as methanol, ammonia and the like, by direct synthesis from their component gases, the reacting gases are passed at high temperatures and under pressure over a catalyst mass, whereupon the gases combine exothermically, usually liberating a greater quantity of heat than necessary to maintain the optimum temperature required for the reaction to proceed.

In the manufacture of methanol the optimum temperature of the carbon monoxide and hydrogen reaction mixtures for satisfactory operation is between 300° to 400° C. The synthetic ammonia reaction between nitrogen and hydrogen is usually carried out at temperatures between 400 and 600° C., and for maximum yields, and for most efficient utilization of the catalyst material, considerably closer temperature controls are desirable often within a 50° range within the temperature range mentioned, for example between about 450 and 500° C.

Temperature control has been effected in industrial installations used in the past, by a number of expedients, one of which involves leading partially preheated reaction gases through the catalyst bed but out of contact therewith and thereafter passing these gases in reacting contact with the catalyst. In this procedure the gases are raised to reaction temperature as they proceed through the caalyst bed, withdrawing heat from the gases reacting in the catalyst chamber. However, near the top of the catalyst bed, very little cooling is effected by the hot gases, since at this point they are close to the reaction temperature, and local overheating of the catalyst tends to occur.

Quenching with cold gases passed directly into the catalyst bed or admixed with the gases to react, before bringing them into contact with the catalyst proved unsatisfactory, as this prior art procedure resulted in a poor temperature gradient by bringing the temperature of the top section of the catalyst below the temperature of optimum reaction efficiency and preventing a maximum conversion by the catalyst. Moreover, quenching with cold gases added directly into the catalyst bed was also unsatisfactory because it caused channelling which was difficult to stop due to the enhanced differences in densities between hot and cold gases at high pressures.

I have now found that unusually efficient and rapid temperature control can be effected in such reactions whereby a very uniform temperature gradient may be maintained within a desired narrow optimum temperature range with the avoidance of extreme peaks and troughs of temperature variations within the catalyst mass by my invention which involves a novel arrangement of apparatus, and method for cooling and quenching the exothermic reaction by a combination of gases conducted in heat exchanging relation to, and out of contact with the catalyst, and of other portions of cooling gases conveyed into direct contact with and merged with the reaction gases at progressive stages of their passage through the catalyst mass.

In carrying out my invention, I arrange the catalyst in a plurality of separate spaced apart catalyst beds, disposed between perforated grates, the separate catalyst beds, with the walls of the catalyst assembly forming the boundaries of the intervening chambers. Extending throughout the entire series of catalyst beds, a plurality of heat exchanger tubes are disposed which serve to carry the incoming gases to react from the bottom of the assembly upwardly to the top of the uppermost catalyst bed, while serving the dual purpose of cooling the catalyst, and preheating the gases to react, which are raised to approximately the lower temperature limit of the optimum reaction range while passing through the combined catalyst masses. These heat exchanger tubes serve as the primary temperature regulating means for controlling the temperature of the reaction. For eliminating extremes of temperature variations, and particularly for uniformly cooling the gases in the first few baskets I pass smaller quantities of cold gases to react, directly into the preheated gas masses in the chambers between the catalyst beds, just prior to the downward passage of these gases through the separate catalyst beds, in such a way that the hot and cold gases are merged to a uniform desired temperature before passing in direct contact with the particular catalyst mass. Fresh cold gases to react, are thus introduced separately to the chamber above the first catalyst basket, and to the chambers intermediate one or more of the plurality of catalyst beds and there subjected to turbulent contact with the hot gases emerging either from the preheater tubes in the case of the top catalyst bed, or emerging from reacting contact with the catalyst if in the intermediate chambers, and the combined, tempered gases are caused to flow in contact with the preheater tubes passing therethrough, to somewhat modify the temperature of the gases therein. This causes the preheater tubes to exert a greater cooling action on the lower portion of the catalyst bed directly above than they would have if the supplementary cooling gases had not been introduced. The merged gases are then directed into reacting contact with the catalyst bed directly below, and there react, the temperature being partially controlled within the catalyst bed by the preheater tubes just mentioned. Before overheating of the gases or catalyst can occur, the gases again emerge into a chamber, and may again be subjected to the controlled quenching operation described if desired.

The quenching operation may be applied to as many separate subdivisions of catalyst mass as desired. Usually, however, the greatest need for quenching occurs in the first several of a series of, for example, six or more catalyst beds. Accordingly it may be desirable to quench only the first three or four baskets or perhaps even the first basket, as the greater portion of the reaction takes place in the upper baskets upon initial contact of the gases to react, with the catalyst, and thus the upper catalyst beds will be hottest and more greatly in need of greater heat removal than can be provided by the interchanger tubes above.

In the drawing, the figure represents schematically a vertical section of a converter such as an ammonia or methanol converter, adapted for carrying out my invention.

The converter comprises an outer shell 10 adapted to withstand the high pressures used, a conventional preheater assembly 11, and a plurality of separate catalyst baskets, 12, 13, 14, preferably arranged in tandem above preheater assembly 11, and separated therefrom by a solid base 15. Each catalyst bed is contained between upper and lower perforated grates, 16 and 17 respectively, each catalyst bed being spaced apart from each succeeding catalyst bed so as to form chambers between the catalyst beds. These chambers are further separated into upper and lower portions 18, 19 by solid tube sheets 20, having circular center holes 21, 39 and 40 therein. A main inlet 22 is provided at the top of the converter leading into gas chamber 23 which in turn directs the incoming gases through annular passageway 24 between the outer converter shell 10 and inner catalyst and preheater assembly, the latter of which is provided with gas openings 38.

A series of supplementary gas inlets 25, 26 and 27 lead respectively into the upper portions 18 of the chambers above the catalyst beds 12, 13 and 14 through separate conduits 28, 29 and 30, respectively.

A connecting pipe 31 leads through manifold 32 into a series of heat exchanger tubes 33 extending preferably vertically throughout the length of the combined catalyst beds 12, 13, 14 and separating chambers 18, 19, terminating in chamber 18 above the topmost catalyst bed.

Below the lowest catalyst bed and opening therefrom is a chamber 34 opening into a plurality of heat exchanger tubes 35 in the preheater assembly 11. The heat exchanger tubes open at their lower extremities into manifold 36, which in turn leads to exit pipe 37.

The arrows in the drawing indicate the direction of flow of gases as they pass into, through and out of the converter.

In operation, the cold gases to react, enter chamber 23 of the converter through main inlet 22, and pass down the wall of the apparatus between outer shell 10 and the catalyst baskets 12, 13, 14 and preheater assembly 11 and enter the bottom of the heat exchanger assembly 11 through openings 38. The gases pass around heat exchanger tubes 35 which are filled with hot reaction gases, which give up a portion of their heat to the cold entering gases. After passing through the heat exchanger, the entering gases pass through pipe 31 into manifold 32, and hence through tubes 33, upwardly through the successive catalyst beds 14, 13, 12 and intermediate chambers 18, 19. The partially preheated gases in the heat interchanger tubes 33 absorb a part of the heat of the exothermic reaction taking place in the catalyst beds, and are thus themselves heated up to, or slightly above, the initial reaction temperature by the time they have passed through all the catalyst beds. The gases to react emerge from heat exchanger tubes 33 in chamber 18 above the topmost catalyst basket 12, where the gases from all the tubes are merged and are directed through annular opening 21, where they fan out and pass downwardly through perforated grate 16 into the first catalyst bed 12 where reaction takes place. The reacting gases pass successively through the several catalyst beds, merging after each successive catalyst basket in chambers 18, to be directed through annular openings 39, 40, etc., in tube sheets 20 separating the chambers between the respective catalyst baskets. After passing through all the several catalyst beds the reaction gases merge again in chamber 34, and thence pass through heat exchanger tubes 35, where they give up a portion of their heat to the cold incoming gases to react, and finally pass through manifold 36 out the exit pipe 37 to a conventional recovery apparatus (not shown).

For effecting supplementary temperature control of the reacting gases independently in each of the several catalyst beds, cold fresh gases to react are fed separately to the upper chambers 18 above each catalyst bed, as the temperature variations require. Separate inlets 25, 26 and 27 lead the quench gases to the top chambers above the respective catalyst baskets through separate conduits 28, 29 and 30, respectively. The supplementary gases entering the quench inlets are discharged centrally into upper chambers 18, where in the top catalyst bed, they merge with the gases emerging from the preheater tubes 33, and are directed, together with the heated gases through annular opening 21 where they fan out over perforated grate 16 and pass downwardly through the first catalyst bed.

The quench gases to the second catalyst bed, are likewise discharged centrally into the second catalyst chamber, merge with gases emerging from the first catalyst basket, pass through annular opening 39 to chamber 19, and thence through perforated grate 16 through the second catalyst basket. The quench for each successive catalyst bed operates in a similar manner.

The introduction of the cold quenching gases, as described, to chambers between the catalyst beds, causes the quenching gases to be thoroughly mixed with the hot reaction gases to present a mass of gases to react, to the succeeding catalyst bed of uniform temperature and to thus prevent channelling of the cold gases and local undercooling of the succeeding catalyst bed as almost invariably occurs when cold quenching gases are introduced directly into the catalyst bed.

The separation of the catalyst beds by chambers, as described, through which heat exchanger tubes pass, has the additional beneficial effect of exerting a temperature controlling effect on the lower portion of the catalyst bed above the chamber, due to cooling of the gases passing upwardly through the heat exchanger tubes.

The combined effect of the quench gases, on the upper portion of the catalyst bed below its introduction by direct cooling of the gases to react, and also on the lower portion of the catalyst bed above the introduction of the quench, makes for an extremely smooth temperature gradient, free from extreme peaks and troughs, and permits ready and effective temperature control within an extremely narrow range by variations in the quantities and/or temperatures of the several portions of gases to react, which makes for high yields of reaction products, more rapid put-through of gases, and longer catalyst life.

While the above describes the preferred embodiments of my invention, it is understood that it is not to be considered limiting, as modifications and departures may be made therefrom as understood by those skilled in the art, within the scope of the specification and claims.

What is claimed is:

1. An apparatus for conducting exothermic gaseous reactions which comprises an outer shell, a heat exchanger mounted in the bottom of the shell, an upper header and a lower header mounted above said heat exchanger, a plurality of superimposed catalyst receptacles mounted between said headers and spaced from the wall of said shell to leave an annular space therebetween which communicates with said heat exchanger, the upper and lower limits of each of said catalyst receptacles being defined by upper and lower foraminous grates, a plurality of vertical gas tubes connecting said headers and passing through said catalyst receptacles, centrally apertured tube sheets above each of said catalyst receptacles spaced above said upper grates to leave gas distributing chambers therebetween, the uppermost tube sheet forming the bottom of said upper header, said lower grates being spaced above said tube sheets to leave gas collecting chambers therebetween, said gas distributing chambers communicating with said gas collecting chambers through the central aperture of said tube sheets, means for introducing a stream of gases to be reacted into said annular space between said catalyst receptacles and said shell, a plurality of tubes communicating with the lowermost gas collecting chamber and passing through and in indirect heat conducting relationship with said heat exchanger, a nest of concentric gas heating tubes mounted centrally above the upper header, said gas heating tubes being connected individually to a source of gases to be reacted, one of said feeding tubes being connected to the upper gas header, and the other tubes being connected to said gas collecting chambers at points adjacent to said central apertures, said tubes being adapted to mix cold gases with the hot gases before they pass through said catalyst receptacles, and means for individually regulating volumes of said gas streams to control the temperature of the gases as they are about to pass through said catalyst receptacles.

2. An apparatus for effecting catalytic exothermic gaseous reactions which comprises an outer shell, upper and lower gas headers mounted in said shell, at least one catalyst receptacle mounted between said headers, a plurality of vertical gas tubes connecting said headers and passing through said catalyst receptacle, a centrally apertured tube sheet above said catalyst receptacle, said tube sheet forming the bottom of said upper header and spaced from said catalyst receptacle to leave a gas distributing chamber beneath said tube sheet and above the catalyst receptacle, means for introducing a stream of preheated reactant gases into said lower header, a centrally mounted vertical gas feeding tube mounted above the upper header and connecting therewith adjacent the central aperture of said tube sheet, said gas feeding tube being adapted to feed a stream of cold reactant gases to be mixed with said stream of preheated gases as the latter passes through said central aperture, thereby cooling the same, means for collecting the reacted gases flowing from the bottom of the catalyst receptacle and for conducting them to lower catalyst receptacles and eventually out of the apparatus, and means for regulating the relative volumes of said gas streams in order to control the temperature of the gas as it passes through said catalyst receptacle.

3. An apparatus for effecting exothermic gaseous reactions which comprises an outer shell, upper and lower gas headers mounted in said shell, at least two superimposed catalyst receptacles mounted between said headers, the upper and lower limits of each of said catalyst receptacles being defined by upper and lower foraminous grates, a plurality of vertical gas tubes connecting said headers and passing through said catalyst receptacles, a centrally apertured tube sheet above and spaced from each upper grate leaving a gas distributing chamber therebetween, the upper tube sheet forming the bottom of said upper header, said lower grates being spaced above said tube sheets leaving gas collecting chambers therebetween, which chambers communicate with the gas distributing chambers through the central apertures of said tube sheets, means for introducing a stream of preheated reactant gases into the lower gas header, a nest of concentric gas feeding tubes mounted above the upper header, said tubes connecting a source of cold reactant gases with said upper header and with said gas collecting chambers at points adjacent the central aperatures in each tube sheet, whereby cold gases are admixed with the hot gases as they pass through said central aperatures into the gas distributing chambers therebeneath, means for individually regulating the volumes of said gas streams to control the temperature of the gases passing through the catalyst receptacles, and means for collecting the gases passing downwardly through the lowest bed of catalyst and for leading these gases out of the apparatus.

LEONARD A. STENGEL.

REFERENCES CITED

The following references are of record in the file of this patent:

UNITED STATES PATENTS

| Number | Name | Date |
|---|---|---|
| 1,704,214 | Richardson | Mar. 5, 1929 |
| 2,104,858 | Ferguson | Jan. 11, 1938 |
| 2,399,827 | Roach et al. | May 7, 1946 |